US006818582B2

(12) United States Patent
Maunula (10) Patent No.: US 6,818,582 B2
(45) Date of Patent: Nov. 16, 2004

(54) ADSORBENT CATALYST

(75) Inventor: Teuvo Maunula, Oulu (FI)

(73) Assignee: Kemira Metalkat Oy, Vihtavuori (FI)

(*) Notice: Subject to any disclaimer, the term of this patent is extended or adjusted under 35 U.S.C. 154(b) by 90 days.

(21) Appl. No.: 09/828,898

(22) Filed: Apr. 10, 2001

(65) Prior Publication Data

US 2002/0013226 A1 Jan. 31, 2002

(30) Foreign Application Priority Data

Apr. 10, 2000 (FI) .............................................. 20000854

(51) Int. Cl.[7] .............................................. B01J 21/00
(52) U.S. Cl. .................. 502/73; 502/303; 502/304; 502/328; 502/334; 502/339; 502/241; 502/242; 502/243; 502/246; 502/250; 502/251; 502/252; 502/262; 502/263
(58) Field of Search .................. 502/73, 262, 303, 502/304, 327, 328, 332, 333, 334, 339, 351, 341, 344, 354, 355, 439, 241, 242, 243, 246, 250, 251, 252, 258, 263, 66, 74, 527.12

(56) References Cited

U.S. PATENT DOCUMENTS

| | | | | |
|---|---|---|---|---|
| 4,665,051 A | * | 5/1987 | Nonnenmann | 502/439 |
| 4,849,398 A | * | 7/1989 | Takada et al. | 502/303 |
| 5,001,103 A | * | 3/1991 | Koberstein et al. | 502/262 |
| 5,041,407 A | | 8/1991 | Williamson et al. | |
| 5,063,192 A | | 11/1991 | Murakami et al. | |
| 5,538,697 A | * | 7/1996 | Abe et al. | 422/171 |
| 5,547,913 A | * | 8/1996 | Muramoto | 502/328 |
| 5,597,771 A | | 1/1997 | Hu et al. | |
| 5,628,925 A | * | 5/1997 | Domesle et al. | 219/121.64 |
| 5,677,258 A | | 10/1997 | Kurokawa et al. | |
| 5,688,740 A | * | 11/1997 | Bolshakov et al. | 502/326 |
| 5,753,192 A | | 5/1998 | Dobson et al. | |
| 5,906,958 A | | 5/1999 | Park et al. | |
| 6,047,544 A | * | 4/2000 | Yamamoto et al. | 60/285 |
| 6,071,850 A | * | 6/2000 | Friedman et al. | 502/439 |
| 6,087,298 A | * | 7/2000 | Sung et al. | 502/333 |
| 6,093,378 A | * | 7/2000 | Deeba et al. | 423/213.5 |
| 6,139,808 A | * | 10/2000 | Mizuno et al. | 422/180 |
| 6,159,897 A | * | 12/2000 | Suzuki et al. | 502/351 |
| 6,180,075 B1 | * | 1/2001 | Lindner et al. | 423/213.2 |
| 6,221,804 B1 | * | 4/2001 | Yamada et al. | 502/326 |
| 6,254,842 B1 | * | 7/2001 | Hu et al. | 423/213.5 |
| 6,294,140 B1 | * | 9/2001 | Mussmann et al. | 423/213.5 |
| 6,306,794 B1 | * | 10/2001 | Suzuki et al. | 502/304 |
| 6,348,430 B1 | * | 2/2002 | Lindner et al. | 502/304 |
| 6,375,910 B1 | * | 4/2002 | Deeba et al. | 423/239.1 |
| 6,391,822 B1 | * | 5/2002 | Dou et al. | 502/325 |
| 6,413,483 B1 | * | 7/2002 | Brisley et al. | 423/239.1 |
| 6,497,848 B1 | * | 12/2002 | Deeba et al. | 422/180 |
| 6,500,392 B2 | * | 12/2002 | Mizuno et al. | 422/177 |

FOREIGN PATENT DOCUMENTS

| | | |
|---|---|---|
| DE | 4445945 | 8/1996 |
| EP | 560991 | 4/1993 |
| EP | 0 613 714 A2 | 9/1994 |
| EP | 653238 | 5/1995 |
| EP | 666103 | 8/1995 |
| EP | 0 669 157 A1 | 8/1995 |
| EP | 778072 | 6/1997 |
| EP | 838255 | 4/1998 |
| EP | 857510 | 8/1998 |
| EP | 864353 | 9/1998 |
| EP | 892159 | 1/1999 |
| EP | 0 968 763 A1 | 1/2000 |
| FI | 94455 | 5/1995 |
| WO | 97/02886 | 1/1997 |
| WO | 97/47373 | 12/1997 |
| WO | 98/45582 | 10/1998 |
| WO | 98/56492 | 12/1998 |
| WO | 99/00177 | 1/1999 |

OTHER PUBLICATIONS

H. Iwakuni et al., "Development of Lean NOx Catalyst for Lean Burn Gasoline Engine", Science and Technology in Catalysis 1998, pp 251–256.

E. Chaize et al., "Reduction of NOx in Lean Exhaust by Selective NOx–Recirculation (SNR–Technique) Part II: NOx Storage Materials", Society of Automotive Engineers, Inc., 1998, 982593 , pp 11–19.

* cited by examiner

Primary Examiner—Steven Bos
Assistant Examiner—Cam Nguyen
(74) Attorney, Agent, or Firm—Burns, Doane, Swecker & Mathis, L.L.P.

(57) ABSTRACT

An adsorbent catalyst for reducing the amounts of nitrogen oxides, hydrocarbons and carbon monoxide contained in exhaust or combustion gases, which catalyst adsorbs nitrogen oxides, when the exhaust or combustion gases contain in excess of oxygen, and liberates and reduces the adsorbed nitrogen oxides, when the gases contain oxygen in stoichiometric amounts or less, which adsorbent catalyst include a porous support material the surface area of which is large and which contains at least the following: a first catalytic metal, which is preferably Pt, a first $NO_x$ adsorbent, which preferably contains at least one of the following metals: Ba and Sr, a second $NO_x$ adsorbent, which preferably contains at least one of the following metals: La and Y, and a redox $NO_x$ adsorbent, which preferably contains at least one of the following metals: Ce, Zr, Ti, Nb, Mn, Pr, Nd, Sm, Eu and G. The invention also relates to methods for reducing the amounts of nitrogen oxides, hydrocarbons and carbon monoxide contained in exhaust or combustion gases.

25 Claims, 7 Drawing Sheets

ADSORBENT CATALYST

This application claims priority under 35 U.S.C. §§ 119 and/or 365 to application Ser. No. 20000854 filed in Finland on Apr. 10, 2000; the entire content of which is hereby incorporated by reference.

FIELD OF THE INVENTION

This invention relates to an adsorbent catalyst for purifying exhaust gases or combustion gases, especially exhaust gases from gasoline, diesel or natural gas engines.

BACKGROUND OF THE INVENTION

With gasoline engines, significant decreases (10–20%) in fuel consumption have been attained with new engines where direct injection of gasoline and excess air are used. Depending on running stage, the blend ratio air/fuel (A/F=air/fuel) is in these engines clearly on the dilute side ($\lambda$ is between 1.1 and 2.4) for extended periods, whereby air is introduced in excess in relation to the amount needed for complete combustion of the fuel. At other times, the blend ratio of the engine is stoichiometric ($\lambda=1$) or rich ($\lambda<1$), whereby these circumstances must normally be adapted to in varying driving conditions and by high driving speeds. The management system (EMS=Engine Management System) strives to comply with the running parameters programmed in the memories of the vehicle that are based on the engine and driving condition mapping of the automobile maker. A diesel engine is traditionally more fuel conscious especially in heavy motor vehicles, and the injection technique of the fuel has developed together with the engine management systems to the point, where raw emissions and especially the amount of emitted particles are minor. The increasing change-over to dilute blend engines has, however, made the functioning of the traditional removal techniques of the nitrogen oxide exhausts more difficult.

With a three-function catalyst the concentrations of nitrogen oxides, carbon monoxide and hydrocarbons may be decreased by over 90% efficiency during normal motor vehicle test cycles (according to Euro 3/Euro 4 levels). When using a three function catalyst, one strives to keep the circumstances (air/fuel blend ratio, A/F) as stoichiometric as possible with the aid of responses from the $\lambda$ sensors and the engine management system. The emission limits for particles and for $NO_x$ become stricter when shifting from Euro 3 to Euro 4: particles down to 0.025 g/km and $No_x$ down to 0.25 g/km.

However, in exhaust gases containing oxygen in excess, the amounts of reducing agents and their selectivity towards reducing $NO_x$ are low. Normally, gaseous emissions (HC, CO) are purified at more than 80% conversion, and particles at about from 20% to 40% conversion when using an able oxidizing catalyst and $\lambda$ being clearly over 1. The conversion of nitrogen oxides is in diesel exhausts normally about from 0% to 20%, whereby even a four-function catalyst is mentioned (CO, HC, NOx, particles). In diesel oxidizing catalysts, normally Pt is used as the active metal, it being resistant to $SO_x$. The catalysts are often positioned as close to the engine as possible (CC=Closed Coupled), instead of being positioned under the body (UF=Under Floor), as usual.

In order to decrease the amount of nitrogen oxides, Ir catalysts, used together with three-function catalysts or Pt catalysts, have been developed and used commercially even in Euro 2 level direct injection automobiles (GDI=Gasoline Direct Injection). However, this kind of catalyst constantly requires a relatively high hydrocarbon content in the exhaust gas, the thermal and chemical resistance of the Ir catalysts is rather poor (max 800–900° C.), and the $NO_x$ conversion remains rather low. Even Pt—Ir—Rh/ZSM5 catalysts have previously been used in dilute gasoline subjects (Iwakuni et al., Science and Tech. in Catal. 1998). Although one has strived to increase the endurance of zeolite based catalysts, it is, however, insufficient in full load driving circumstances.

Because catalysts based on continuous $NO_x$ reduction do not function at the levels required by Euro3 or Euro4 exhaust limits, new types of catalyst have been developed that are based on $NO_x$ adsorption ($NO_x$ trap) (SAE Publication 982593). Their functioning is based on adsorbing nitrogen oxides during dilute phases into the $NO_x$ trap components of the catalyst, one of which is e.g. BaO. Nitrogen oxides are oxidized to $NO_2$, they are adsorbed as nitrates ($Ba(NO_3)_2$) in the dilute phase (duration, e.g. from 15 s to 5 min) and they are reduced to nitrogen in the short enrichment period arranged on purpose (duration, e.g. from 1 s to 5 s, A/F ratio less than stoichiometric). The method may be tuned (timing, regenerations) to function in accordance with the engine and the driving conditions. The most usual adsorbent Ba binds the sulfur oxides ($SO_x$) of the exhaust gas tightly as sulfates on its surface, and this weakens functioning of the catalyst as time goes on. Depending on the sulfur content of the fuel, the catalyst must be totally regenerated every 1000–6000 km to rid it of sulfate. Barium (Ba) sulfate can be decomposed by raising the temperature of the exhaust gas to more than 650° C. for a time long enough in clearly rich circumstances. Thereby the sulfates are decomposed as sulfides, and are liberated mainly as hydrogen sulfide or COS into to exiting exhaust gas. Thus the functioning of the catalyst is partly or totally recovered. In unfavorable circumstances, BaO may bind $CO_2$ as carbonates on its surface more tightly than nitrates. The functioning of catalysts based on Ba calls for a very low sulfur level of the fuel, and also, the level of functioning of the catalysts mentioned is not high enough.

The exhaust gas flows continuously through the $NO_x$ trap catalyst, the continued functioning of which is based on the enrichments guided by the management system (EP 0 560 991, 1993). HC and CO are presented as functioning as reducing agents in the enrichments and the dilute phases are of a duration more than 50 times longer than the enrichment phases. The $NO_x$ adsorbent in the catalyst is K, Na, Li, Cs, Ba, Ca, La or Y and as noble metal, Pt. Also a Ba—Cu composite is claimed to function. After the $NO_x$ trap catalyst, or before it, there may be a normal three-function catalyst. In the EP patent, even a system for purifying diesel engine exhausts with the same catalyst is described.

Another concept (EP 0 838 255) contains on the surface of a porous support (aluminum oxide) alkali metal (Na, Li, K, Rb), Ti and a noble metal (Rh, Pt, Pd). Also, the catalyst may contains rare earth metals or Mg. It has been claimed that by very high Na and K contents (over 30% by weight, EP 0 857 510) or Li contents (over 10% by weight, WO 97/47 373) together with noble metals, an efficient $NO_x$ trap material has been accomplished. Sr (6–15% by weight) may be used together with Zr and sulfate even in place of Ba in the catalyst (U.S. Pat. No. 5,753,192).

With various mixed oxides (in general $A_aB_bO_4$, where B is mainly Al, and A is Mg, Ca, Mn, Fe, Ni, Co, Cu, Zn, Sn or Ti) there have been accomplished $NO_x$ adsorption capacities (WO 98/56 492).

Use of W-phosphate in the Pt catalyst has been proposed in order to hinder the harmful effects of sulfur in $NO_x$ adsorption (EP 0 864 353).

A solution has been proposed, according to which there are two $NO_x$ trap catalysts side-by-side whereby concomitantly one is at the adsorptive stage and the other at the reductive stage (WO 98/45 582). The catalyst contains Sr, Ba, Ca, $BaTiO_3$, $BaZrO_3$, $LaZrO_3$, $MnO_2$, $LaMNO_x$ and a mixture of oxides of La, Ce, Ti and Zr, as well as Pt, Rh or Pd. Similar compounds ($BaMnO_3$, $CaMnO_3$) have been used also in another Patent (U.S. Pat. No. 5,906,958). The method is complicated and it requires a double amount of the catalyst as well as a three-way valve that functions in hot circumstances (even 900° C.), in order to direct the exhaust gas.

It has been claimed that a mixture of Ti/mordenite and mixed oxide (La, Ba, Co) functions in the presence of hydrocarbons, giving a good $NO_x$ conversion (DE 44 45 945).

There has been presented a two-layer catalyst where the Pt and $NO_x$ adsorbents (Ba, K) are in the first layer and the Rh is in the second layer (WO 99/00 177). The aim is to oxidize NO to $NO_2$ in the Pt layer and to reduce the nitrogen oxides liberated to nitrogen in the Rh layer. Also, it is proposed that a stoichiometric blend ratio is sufficient in order to regenerate (reduce) the nitrates of the catalyst surface. Even in a former publication (WO 97/02 886) there has been proposed a two-layer catalyst in which in one layer there are the $NO_x$ trap material and Pt, and in the other, the reduction catalyst. The layers may even be blended into each other. Usually, in a two-layer catalyst separate compositions disturb one another (noble metals pass in adsorption into the same layer, addition of certain $NO_x$ trap compounds (Ba, K) disturbs the regeneration of nitrates=flammability problem). The decomposition and reaction of the nitrates can not begin before the active site in question starts to function in the reaction during the enrichment peaks. It is difficult to make function a $NO_x$ trap catalyst in which in the same layer there have been added compounds that bind nitrates at both high and low temperatures, because they interfere with each other, whereby usually the higher temperature $NO_x$ trap capacity is dominant.

In one solution (EP 0 778 072) three catalysts have been mounted is series: the first is the dilute side $NO_x$ catalyst, the second is the $NO_x$ trap and the third is a three-function catalyst. However, the solution is complicated and the efficiency of known $NO_x$ catalysts is poor due to the low HC content and probably, it does not function well during enrichments peaks.

It has been proposed that the harmful effects of sulfur be decreased by using in front of the $NO_x$ trap catalyst an adsorbent unit for sulfate (EP 0 892 159). By this kind of solution, usually, only a slow-down of the deactivation of the $NO_x$ trap catalyst situated behind the former by sulfates may be accomplished, because in rich mixture peaks gaseous sulfur compounds should pass through the $NO_x$ trap catalyst without adsorbing thereon. Thereby the regeneration of the $NO_x$ trap catalyst (desorption of sulfides) in rich phases is, in any case, the decisive characteristic in view of a prolonged use.

There has been proposed even a catalyst solution where the surfaces of two metal foils have been coated with catalyst surfaces, the support material, physical structure or noble metals of which are mutually distinct in various locations (FI 94 455). In this way, good results may be gained in chain or serial reactions that cannot be attained in the same catalyst layer. However, the method is meant to be used in context of a pure catalyst reaction, the use of adsorptive methods together with the catalyst in circumstances of varying composition changes the situation altogether.

The catalyst reaction is based on continuously progressing stages, where reactants and reaction products participate: 1) the outward transfer of matter to the outer surface of the catalyst and away from the surface, 2) pore diffusions from the outer surface to active sites in the pores and away, 3) adsorptions and desorptions to active sites, 4) surface reactions at active sites. Although adsorption is one of the stages in the mechanism of the catalyst reaction, the adsorption of reactants may proceed only to a certain equilibrium, after which more of the component in question cannot be adsorbed onto the catalyst. Too much adsorption is usually the reason for that reactions will not start at low temperatures. The adsorptive methods per se are totally distinct from the catalyst methods, and they aim at storing certain compounds onto the adsorbent, which may e.g. be changed from time to time to a new one, or be regenerated after the adsorptive capacity has been exhausted. In catalysis and in adsorption the chemical nature of active sites is also very different. However, in exhaust gases the amount of impurities to be removed, such as the $NO_x$'s, is so high that the adsorptive capacity is, depending on the circumstances, exhausted in a few minutes, at the latest.

SUMMARY OF THE INVENTION

This invention aims to provide a continuously functioning combination of an adsorbent and a catalyst suited for $NO_x$ removal as well as a method with the aid of which high conversion levels of nitrogen oxides to nitrogen are attained, when the exhaust gas blend contains, on the average, an excess of oxygen and typical impurities from fuel and lubricant and the engine.

The invention is based on the fact that the composition, structure, and method, as well as circumstances of making the adsorbent catalyst, are such that a clearly distinct and better solution is obtained compared to the catalysts previously proposed, the resistance and regenerability of which in the presence of sulfur dioxide have also improved.

Inventive fields of use are exhaust gas and combustion gas applications in moving and stationary subjects, where the combustion ratio of the blend is dilute, that is to say, containing excess oxygen continuously or temporarily, and as fuel, any liquid, gaseous or solid fuel may be used.

The adsorbent catalyst concept according to the invention comprises several different chemical compounds, the function of which is, in one or several catalyst reactors, to catalyze oxidization of NO to $NO_2$, to adsorb nitrogen oxides/nitrates/nitrites and to catalyze reduction of nitrogen oxides to nitrogen, to adsorb reducing agents by rich blends, to catalyze oxidization of CO/hydrocarbons/hydrogen to water and carbon dioxide even in circumstances containing sulfur compounds.

According to the invention, there is thus provided an adsorbent catalyst for reducing the amounts of nitrogen oxides, hydrocarbons and carbon monoxide contained in exhaust or combustion gases, which catalyst adsorbs nitrogen oxides, when the exhaust or combustion gases contain excess oxygen, and liberates and reduces the adsorbed nitrogen oxides, when the gases mentioned contain oxygen in stoichiometric amounts or less, which adsorbent catalyst is characterized in that it comprises a porous support material the surface area of which is large and which contains at least the following:

a first catalytic metal, which is preferably Pt, a first $NO_x$ adsorbent, which preferably contains at least one of the following metals: Ba and Sr, a second $NO_x$ adsorbent, which preferably contains at least one of the following metals: La and Y, and a redox $NO_x$ adsorbent, which preferably contains at least one of the following metals: Ce, Zr, Ti, Nb, Mn, Pr, Nd, Sm, Eu and Gd.

The support material may additionally contain a second catalytic metal, which preferably comprises at least one of the following metals: Rh, Pd and Ir.

The support material may additionally contain a third $NO_x$ adsorbent, which preferably contains at least one of the following metals: K, Na, Li, Ca, Tb and Cs.

The support material may additionally contain a fourth $NO_x$ adsorbent, which preferably contains at least one of the following metals: Mg and Be.

The adsorbents mentioned may be in the form of oxides, sulfates, nitrates, aluminates or as metals, preferably they are in the form of oxides.

The redox $NO_x$ adsorbent mentioned preferably contains preferably Ce and/or Zr.

The redox $NO_x$ adsorbents mentioned preferably have formed between them a mixed oxide or a mixture thereof.

Preferred redox $NO_x$ adsorbents are for example mixed oxides of ZrCe, MnCeZr and MnCe.

Preferably, of the redox $NO_x$ adsorbent mentioned, and of the second $NO_x$ adsorbent, a mixed oxide comprising two or more elements or a mixture thereof has been formed.

The average particle size of the first and/or the second catalytic metal is preferably less than 30 nm in fresh support material, particularly preferred is less than 10 nm.

The average particle size of the redox $NO_x$ adsorbent is preferably more than 5 mm in fresh support material, particularly preferred is from 5 mm to 30 mm.

An adsorbent catalyst according to the invention may be structured such that it comprises a first surface, on which there is a first coating that contains the support material and said adsorbents, or a part thereof, and a second surface, on which there is a second coating, which contains the support material and said adsorbents, or a part thereof, whereby the compositions of the coatings are identical or varied.

The first surface mentioned may comprise an essentially smooth metal foil, and the second surface may comprise a corrugated metal foil, whereby the metal foils form a honeycomb that has numerous flow channels for gas.

According to one embodiment both coatings comprise the first catalytic metal Pt, while only the second coating comprises a second catalytic metal.

Preferably both sides of the metal foils mentioned are coated.

Preferably the first catalytic metal has been divided concentration wise between various foils in such a way that in one foil the Pt load is about 0–90 $g/ft^3$, and in the other foil the Pt load is about 70–400 $g/ft^3$, whereby the volume relates to the volume of the honeycomb formed by the foils. Here the Pt load in one foil may be about 10–90 $g/ft^3$ and in the other about 70–250 $g/ft^3$.

The first $NO_x$ adsorbent may be divided concentration-wise between various foils in such a way that in the support material of one foil the concentration is about 8–40% by weight, preferably about 10–20% by weight, and in the support material of the other foil the concentration is about 0–10% by weight, preferably about 3–8% by weight, which percentages have been calculated as oxides of the weight of the support material.

The second $NO_x$ adsorbent may be divided concentration-wise between various foils in such a way that in the support material of one foil the concentration is about 8–40% by weight, preferably about 5–15% by weight, and in the support material of the other foil the concentration is about 0–8% by weight, preferably about 1–6% by weight, which percentages have been calculated as oxides of the weight of the support material.

The redox adsorbent mentioned may be divided concentration-wise between various foils in such a way that in the support material of one foil the concentration is about 10–60% by weight, for example about 10–30% by weight, preferably about 15–25% by weight, and in the support material of the other foil the concentration is about 0–10% by weight, preferably about 2–5% by weight, which percentages have been calculated as oxides of the weight of the support material.

It is even possible to form such a structure where the adsorbents are exclusively in the support material of one foil, which foil is preferably the smooth one, and catalytic metals are in the support material of the other foil, which is preferably the corrugated foil.

Preferred support materials are materials, which contain mainly at least one of the following oxides: aluminum oxide, zeolite, aluminum silicate and silica.

According to the invention we have additionally realized a catalyst system for reducing the amounts of nitrogen oxides, hydrocarbons and carbon monoxide contained in exhaust or combustion gases, which system contains the adsorbent catalyst described above and another catalyst positioned in front of the adsorbent catalyst in the direction of gas flow. This other catalyst may be e.g. a three-functional catalyst or a oxidizing catalyst. This other catalyst, in particular, oxidizes efficiently especially hydrocarbons, whereby a mixture is formed, in which the amount of hydrocarbons is low and during rich peaks the percentage of carbon monoxide and hydrogen is as high as possible before the adsorbent catalyst.

The other catalyst mentioned contains one or more catalytic metals, which is preferably one of the following metals: Pd, Rh and Pt.

According to the invention there is also provided a method for reducing the amounts of nitrogen oxides, hydrocarbons and carbon monoxide contained in exhaust or combustion gases, in which method the gases to be purified are introduced through the adsorbent catalyst according to the invention described above, or through the catalyst system according to the invention described above, which adsorbent catalyst adsorbs nitrogen oxides, when combustion or exhaust gases contain in excess of oxygen, and liberates and reduces the nitrogen oxides adsorbed, when the gases mentioned contain a stoichiometric amount of oxygen or less.

Short guided or natural periods may be used, where gases contain a stoichiometric amount of oxygen or less.

According to the invention there is further provided a method for adsorbing an ingredient in a medium onto an adsorbent catalyst and for reacting it catalytically with a reactant into a desired compound, which adsorbent catalyst contains one or more catalytic metals as well as one or more absorbents, and in which method the continuous functioning of adsorption and the catalyzed reaction are realized with the aid of heterogenous conditions.

In this method adsorption and a catalyzed reaction are united without them interfering with each other. The continuous functioning of adsorption and the catalyzed reaction may be provided with heterogenous conditions by proceeding in relation to a certain reaction on one side of the stoichiometric ratio in the adsorption phase and on the other side thereof in the catalyzed phase.

Heterogenous conditions may be provided with changes in temperature or pressure.

The medium mentioned may be a gaseous medium, such as exhaust gas or combustion gas, but even other media can come into question. Said ingredient can be e.g. a nitrogen oxide, whereby the reactant is carbon monoxide, hydrogen gas and/or hydrocarbon, and the product is nitrogen gas. Said ingredient can also be a hydrocarbon, whereby the reactant is gaseous oxygen and the products are carbon dioxide and water. Said ingredient can also be carbon monoxide, whereby the reactant is gaseous oxygen and the product is carbon dioxide. In addition, said ingredient can be an oxide of sulfur, whereby the reactant is hydrogen gas and/or carbon monoxide and the product is sulfur dioxide and/or hydrogen sulfide.

Preferably, long adsorption phases are utilized, whereby one or more reactants are from time to time brought to the adsorbent catalyst.

In this method, the adsorbent catalyst is preferably formed of an essentially smooth metal foil and of a corrugated metal foil, whereby one of the foils contains adsorbents or support material and adsorbents and the other contains a catalytic metal or support material and a catalytic metal.

BRIEF DESCRIPTION OF THE DRAWINGS

The invention is described further in the following with reference to the accompanying drawings, where.

DETAILED DESCRIPTION OF THE INVENTION

Figure 1A:
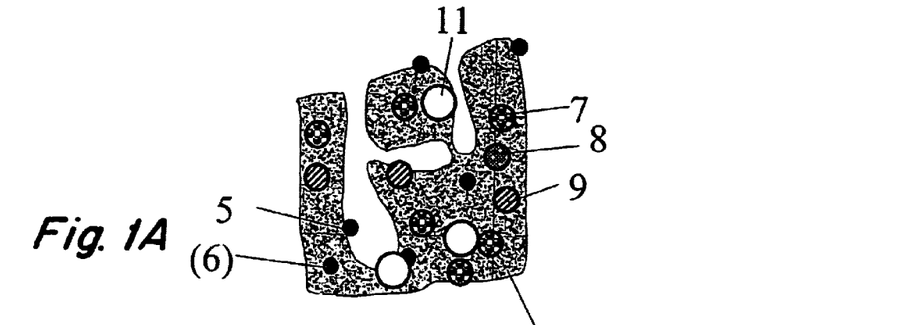
FIG. 1A schematically represents a detail of one adsorbent catalyst according to the invention on a layered catalyst element schematically represented in FIG. 1C.
Figures 1B, 1D:
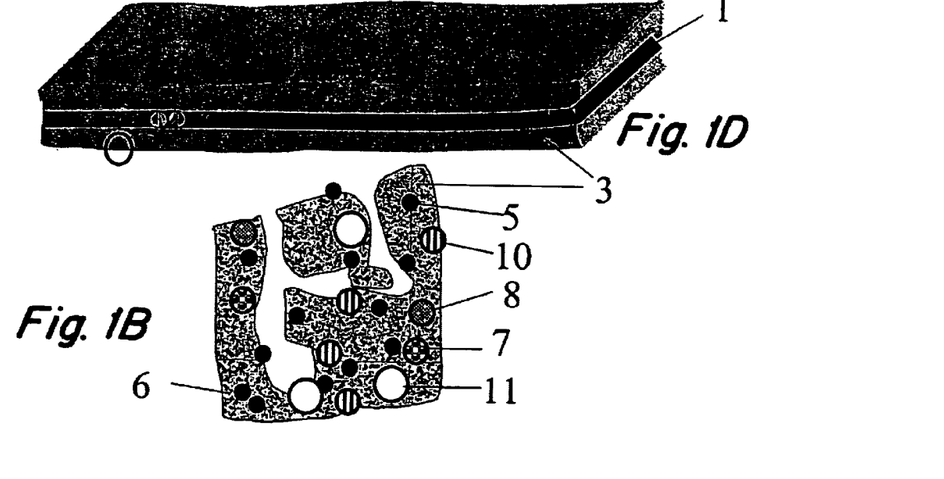
FIG. 1B schematically represents a detail of an adsorbent catalyst according to another embodiment of the invention on a layered catalyst element schematically represented in FIG. 1D.
Figure 1C:
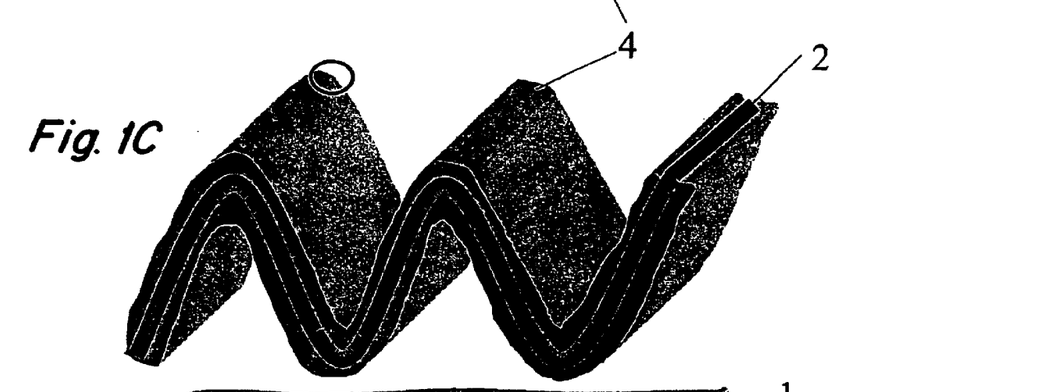

In the adsorbent catalyst according to the invention presented in FIG. 1A and FIG. 1B, the surfaces of the smooth metal foil 1 and of the corrugated metal foil 2 are coated with adsorbent catalyst coatings 3, 4 of identical or varied chemical composition, which are composed in addition to aluminum oxide and/or zeolite/aluminum silicate and/or silica of the following chemical compounds in metallic, oxide, sulfate, nitrate or aluminate form: first active metal 5 Pt, second active metal 6 Rh and/or Pd and/or Ir, basic adsorbents 7 Ba and/or Sr, medium temperature adsorbents 8 La and/or Y, high temperature adsorbents 9 K and/or Na and/or Li and/or Ca, and/or Rb and/or Cs, low temperature adsorbents 10 Mg, redox adsorbents 11 Ce and/or Zr and/or Ti and/or Nb and/or Mn and/or Pr and/or Nd and/or Sm and/or Eu and/or Gd, or a mixed oxide formed thereof.

Mainly Pt and Rh act as catalytically active sites, redox adsorbents 11 act as $NO_x$ adsorbents and promotors that easily/widely change the oxidative state, and others, 7–10, act as compounds that more directly adsorb/absorb nitrates/nitrites in various temperatures.

In a solution according to the invention, one foil, for example the corrugated foil 2, has a high temperature adsorbent 9, such as K, Na, Li and/or Ca, and to the other foil, for example the straight foil 1, has a low temperature adsorbent 10, such as Mg and/or Be. According to the invention, a first active metal may be divided in one foil and a second metal to the other foil, or another metal, especially the expensive Rh, only to one foil. Noble metals are divided optimally in relation to load between the various surfaces. To the surface containing high temperature adsorbent, a low Pt load may be used (10–90 g/cft), and to the surface containing low temperature adsorbent, a high Pt load (70–250 g/cft) may be used, whereby the window for $NO_2$ formation and $NO_x$ adsorption temperature unite in a desired fashion. It is preferred to add a high Pt concentration and Rh to the surface, which especially contains less of the high temperature adsorbents, which typically raise the ignition temperature of the catalyst in oxidizing reactions and reduction reactions. Also the other adsorbents may be divided in various concentrations or totally separated in an optimal fashion between two or more coatings (foils).

Often the size of an adsorbent catalyst must be relatively large, whereby technically seen, in the converter several honeycombs must be positioned one after the other. In the case of several honeycombs different coatings can be added to successive honeycombs and/or different coatings and compositions can be used on opposite sides of the foils. Because more of the corrugated foil will be present in the catalyst (usually over 50% more), the composition can designed as optimal in relation to adsorbent needs of various temperatures and in relation to the active noble metals. Because at high temperatures the adsorptive capacity restricts the efficiency more than at low temperatures, high temperature adsorbents may be used in the corrugated foil. The expensive Rh may primarily be used in the smooth foil, whereby, in any case, a sufficient noble metal density is obtained in relation to ignition of the catalyzed reactions. Likewise, low temperature adsorbent is also primarily used in the smooth foil.

According to experiments, Pt alone may act as active metal. Its role is to oxidize NO to $NO_2$ at over 200° C., which is easily adsorbed onto adsorbents, the temperature being suitable. Nitrates can decompose in a rich blend, desorb and be reduced on the surface of the Pt. The catalyst functions well while containing only Pt. The role of Rh is rather to function only at the reductive phase. According to experiments, Rh accomplishes especially efficient functioning of the low temperature reduction (regeneration of nitrates). With Rh, even catalytic properties can be improved in stoichiometric and rich circumstances in relation to $NO_x$, CO, hydrogen and hydrocarbons, whereby for example the interfering effect of hydrocarbons in adsorption, the formation of ammonia and that of nitrogen oxide is prevented.

We have succeeded in especially improving the functioning of an adsorbent catalyst compared to concepts presented previously by making benefit of components (redox adsorbent) that can change their oxidative state, and thus adsorb nitrogen oxides and oxygen by a dilute blend more efficiently than $NO_x$ trap catalysts containing only alkali metals, earth alkaline metals or earth metals, and thereby further desorption and reduction of nitrates during rich phases. With the aid of these additives, reducing agents can also be utilized and adsorbed during the short rich periods. The adsorption capacity of reducing agents is not very high, because they also tend to be efficiently oxidized in a catalyst with good oxidative capacity. The surface concentration of the reducing agents (CO, hydrogen, partially oxidized hydrocarbons) formed during a rich peak is, however, sufficient to further reduction of nitrogen oxides especially during the few seconds immediately after transferring to a dilute phase. These compounds changing the oxidative state easily with great capacity include according to experiments among others mixed oxides of ZrCe, MnCeZr and MnCe. Ce may be replaced by e.g. Pr, Nd, Sm, Eu or Gd, and Zr may be replaced by Ti, Y, Nb or La, which compounds are possible oxygen storage compounds (OSC). According to previous information OSC might be presumed to be harmful to $NO_x$ adsorption and reduction, because it increases the amount of oxygen present on the catalyst surface. However, the results obtained in the experimented fashion show that the functioning of an adsorbent catalyst is improved, when correctly chosen and made OSC compounds have been added to the catalyst. During enrichment peaks OSC components utilize any oxygen present in the blend, they are themselves reduced, and act as buffer at the beginning of the dilute phase, in addition to which they function well as adsorbents in a different fashion from e.g. Ba or K compounds. Nitrogen oxide entering the surface of reduced OSC material can also be directly reduced to nitrogen, although the activity of the site in question is weaker in reduction than that of noble metals, but presumably distinctly better than that of e.g. Ba or K oxides. The good quality of the inventive adsorbent catalyst is also based on the intimate interaction between adsorbents as well as between adsorbents and active metals. The OSC compound in oxidized state also eliminates efficiently (HC,) CO and hydrogen emissions in enrichment peaks. The Ce containing OSC compound also functions as promotor for the noble metals in the reaction. Comparative experiments showed that the inventive adsorbent catalysts were made to function in such a fashion that the enrichment peaks were not utilized in reducing OSC materials but in reducing nitrogen oxides.

Separate NO adsorption experiments with the OSC materials used in activity testing showed that the NO adsorption capacity of mixed oxides of ZrCe (1:5.7), MnCe (1:1) and MnCeZr (2:2:1) onto a reduced oxide surface was remarkably high compared to other catalyst components, and that the property was retained even after aging at 850° C. According to experiments, the mixed oxide adsorbents adsorbed nitrogen oxides also onto a fully oxidized surface, presumably to its Zr sites, among others. One has strived to benefit from this characteristic even in the case of adsorbent catalysts.

For purifying exhaust gases from automobiles running on dilute gasoline even a three-functional catalyst is needed that ignites in the catalyzed reaction in stoichiometric and rich circumstances at as low temperatures as possible. For this reason, it is preferred to position it in front of the adsorbent catalyst near the engine. A three-functional catalyst must let the enrichment peaks (reducing agents) needed by the adsorbent catalyst through with as low an attenuation as possible. Therefore the size of the three-functional catalyst was relatively small in the experiments, and the amount of OSC compounds was as low as possible. The composition and loading of the catalyst had to be modified based on the fact that cerium oxide does effect even functioning and stability. Therefore a three-functional PdRh catalyst was used that can be rendered stable and thermally resistant, although the amount of Ce is small or zero (example 9). It has been previously stated that the catalyst up front should contain Pt in order for $NO_2$ to form. However, the adsorbent catalyst according to the invention contains so much Pt that $NO_2$ may be formed in situ in the honeycomb behind where are the adsorbents and the sites active in reduction (Pt, Rh). The $NO_2$ formed in the pores of the catalyst, beside the adsorbent, is efficiently adsorbed, because continuous adsorption in the direction of the flow decreases the thermodynamic restriction. Should circumstances call for it, Pt may even be used in the former catalyst in order to improve ignition or durability.

In a system simulating exhaust gas from a natural gas engine it was also noted that it is beneficial to position in front of the adsorbent catalyst a PdPt catalyst active in relation to oxidization of methane. Using a similar system (Pt oxidative catalyst+Pt adsorbent catalyst) for purifying diesel exhaust gave also good results in the laboratory, and the good diesel oxidization catalyst up front does not attenuate the enrichment peak too much. Common to these thee examples was that the catalyst up front was particularly well suited for oxidative reactions whereby very little hydrocarbon reached the $NO_x$ adsorbent catalyst. This had a positive effect on adsorption and regeneration of nitrates throughout the entire temperature range (150–550° C.) studied. Because in the enrichment peaks λ was clearly less than 1, reducing agents reach the adsorbent catalyst in spite of the good oxidative catalyst up front, because the amount of oxygen in the gas blend does not suffice for removal of all combustible compounds. Preferably, mainly hydrogen and carbon monoxide enter the adsorbent catalyst as cracked products from the oxidative/three-functional catalyst. The catalyst up front can also contain $NO_x$ adsorbents according to the invention.

The inventive absorbent catalyst coatings may be also mounted e.g. in a ceramic honeycomb, particle trap or on the walls of various plates. The structures may form parallel flow channels or flow channels in mixed directions (e.g. static mixers). The adsorbent catalysts of varied compositions can also be separate pellets or particles the size of which is large enough (distinctly larger than molecule size, e.g. >1–1000 mm) for differentiating catalyst and adsorbent.

Among other things, it is possible to coat high, medium and low temperature adsorbents also on the same surface one on top of the other, whereby e.g. in a lower layer the high temperature adsorbents (e.g. K, Na, La) are positioned together with Pt, and the low temperature adsorbents (e.g. Mg) in a surface layer together with PtRh. Because it is essential to separate adsorbents of varying functional windows from each other, and because the purpose of Rh is to further the three-functional reaction and to prevent formation of ammonia, this solution is essentially different from the one previously described in (WO 99/00 177).

The inventive solution may even be applied to other methods, where there is a need to unite adsorption, catalyst and the method needed therefor (regeneration). These kind of subjects are, among other things, HC adsorption and emission catalysis ($deNO_x$ and oxidative reactions) in purifying exhaust gases. For example, a zeolite based HC trap coating may be positioned in one foil, and the three-functional/oxidative catalyst coating in the other foil. Foils containing adsorbent and catalytically active components can also be totally separated from each other, although a closer contact by the ways described above is the preferred solution.

In the method, the duration and amplitude of change of the dilute (oxidative) and rich (reducing) phases may be optimized as need be. Essential is the state of the adsorbent catalyst surface. The timing in dilute gasoline subjects is usually such that the duration of the dilute phase is from 10 seconds to 5 minutes, and that of the rich phase is from 1 to 10 seconds. The change of phase can be such that the total ratio is the same (e.g. 60 sec/5 sec), but enrichments of short duration are made more often (e.g. 1.2–6 sec/0.1–0.5 sec). In various applications there is no need to use up all adsorptive capacity, or reduce/desorb nitrate fully from the adsorbent, but the method also functions generally where the situation is somewhere between to two extremes. It is possible to use the solution described in operating conditions, in which the blend ratio is not changed over the stoichiometric point entirely, or not at all, but the adsorbed components are desorbed in some other way, such as by raising the temperature or by changing the pressure. Desorbed components react further to products desired on the catalytically active surfaces. The method may be used even while approaching the stoichiometric conditions very closely from either side, e.g. in cars running on gasoline, although the adsorptive capacity for $NO_3$ is then rather low.

From exhaust gases containing soot, this can be adsorbed chemially or physically onto a first surface, whereby on a second surface there is a coating functioning as an oxidative catalyst. In an $NH_3$ or urea-SCR catalyst, on one foil there may be a coating that adsorbs nitrogen oxides, reducing agent (ammonia, urea or some derivative thereof), when the reductive reaction does not proceed in the catalyst, and in the other, the SCR catalyst proper.

The solution presented is applicable even to subjects, where the through-flowing fluid is a liquid or a mixture of a gas and a liquid. Compounds in the liquid or solubilized in the liquid can be adsorbed with absorbent/adsorbent, while the reaction runs to completion in conditions where oxygen is present in excess and while reduction takes place during the rich peaks. This type of subjects are, for example, purifying water of impurities (nitrates, ammonia). This kind of adsorbent catalyst solution is applicable also to processes where two kinds of conditions exceeding the stoichiometric ratio are needed (oxygen/combustables or some other blend ratio determining the reactions).

In the solution according to the invention adsorbent and catalyst components may be divided concentration-wise also according to their regeneration in relation to sulfates or other poisons in various applicative subjects and circumstances. To one surface may be introduced adsorbents that are harder to regenerate after exposure to sulfur, or that have the most impact on the ignition temperature especially in enrichments (e.g. Ba, Sr, K, Ca, Na). These compounds are also placed separate from Rh which is more sensitive to the deactivating effect of sulfur than Pt. An adsorbent accumulating lots of sulfate at low temperatures may harm even the functioning of neighboring, more easily regenerated components. The more easily regenerated adsorbents are regenerated even during normal use. Also, active metals have $NO_x$ adsorptive capacity that may be utilized near the ignition zone and that is regenerated by small changes in temperature. In addition, adsorbents have some catalytic properties which are needed in order to reduce nitrates to nitrogen.

Adsorbent catalysts can be regenerated after exposure to sulfates by raising the temperature to over 300–500° C. in a rich or stoichiometric gas blend depending on the compositions of the low and high temperature adsorbents. Because the adsorbents have been divided according to their S regeneration in different ways among different surfaces, the system may be made partly functional e.g. by treatment at a lower temperature. It is preferred to use enrichment phases of longer duration (e.g. from 5 seconds to 5 minutes), than in normal enrichment, for removal of sulfur in order to properly remove sulfur. Regeneration may be successfully done even with dilute gas, the temperature being then, however, substantially higher. In order for the regenerative phases not to occur too often, it is preferred to use fuels, the sulfur content of which is as low as possible. On the basis of engine mapping, emissions in various driving conditions are known, but deactivation may be followed e.g. with the aid of commercially available λ or $NO_x$ sensors. When the function coupled to the sensor message gives an alarm (emissions in known operating conditions are too high), the vehicle starts, when the occasion arises, the regeneration process.

In the following, the invention is further described with the aid of examples that refer to the laboratory experiments carried out.

The adsorbents catalysts according to the invention and comparative adsorbent catalysts were according to Table 1.

TABLE 1

Catalysts and adsorbent catalysts used in laboratory testing (Pt and Rh % by weight of metal, others % of oxide by weight in support material).

| No. | Code | Pt % | Rh % | Comp. 1 | Comp. 2 | Comp. 3 | Comp. 4 | Comp. 5 |
|---|---|---|---|---|---|---|---|---|
| 1 | Al (cpd.) | 2.5 | — | — | — | — | — | — |
| 2 | Al—Ba (cpd.) | 2.4 | — | 10% $Ba^{sm}$ | — | — | — | — |
| 3 | Al—Ba—La (cdp.) | 2.2 | — | 10% $Ba^{sm}$ | 9% La | — | — | — |
| 4 | Al—Ba—La—Ce | 1.9 | — | 10% $Ba^{sm}$ | 9% La | 17% Ce | — | — |
| 5 | Al—Ba—La—ZrCe = NSR1 | 2.4 | — | 10% $Ba^{sm}$ | 9% La | 17% Ce | 3% Zr | — |
| 6 | Al—Baw—La—ZrCe = NSR2 | 2.1 | — | 10% $Ba^{wet}$ | 9% La | 17% Ce | 3% Zr | — |
| 7 | NSR1-BaSO4 | 2.4 | — | 10% $BaSO_4^{sm}$ | 9% La | 17% Ce | 3% Zr | — |
| 8 | NSR1-Zeo | 2.4 | — | 12% $Ba^{sm}$ | 9% La | 17% Ce | 3% Zr | 5% ZSM5 |
| 9 | NSR1 + K | 2.4 | — | 10% $Ba^{sm}$ | 9% La | 17% Ce | 3% Zr | 3% K |
| 10 | NSR1 + Mg | 2.4 | — | 10% $Ba^{sm}$ | 9% La | 17% Ce | 3% Zr | 3% Mg |
| 11 | NSR1 + Ca | 2.4 | — | 10% $Ba^{sm}$ | 9% La | 17% Ce | 3% Zr | 3% Ca |

TABLE 1-continued

Catalysts and adsorbent catalysts used in laboratory testing (Pt and Rh % by weight of metal, others % of oxide by weight in support material).

| No. | Code | Pt % | Rh % | Comp. 1 | Comp. 2 | Comp. 3 | Comp. 4 | Comp. 5 |
|---|---|---|---|---|---|---|---|---|
| 12 | NSR1 + Na | 1.9 | — | 10% Ba$^{sm}$ | 9% La | 17% Ce | 3% Zr | 3% Na |
| 13 | NSR1 + Li | 1.9 | — | 10% Ba$^{sm}$ | 9% La | 17% Ce | 3% Zr | 3% Li |
| 14 | Wrinkle: NSR2 + K Smooth: NSR2 + Mg = HK1 | 1.5 1.5 | — — | 10% Ba$^{sm}$ " | 9% La " | 17% Ce " | 3% Zr " | 3% K 3% Mg |
| 15 | Wrinkle: NSR2 + K Smooth: NSR3 = HK2 | 2.2 1.5 | 0.16 0.23 | 15% Ba$^{wet}$ 10% Ba$^{wet}$ | 9% La 1% La | 4.4% Ce 29% Ce | 0.7% Zr 6% Zr | 3% K — |
| 16 | Wrinkle: NSR2 + K Smooth: NSR4 = HK3 | 1.5 2.2 | 0.24 0.30 | 15% Ba$^{wet}$ 5% Ba$^{wet}$ | 9% La 5% La | 4.4% Ce 4.4% Ce | 0.7% Zr 0.7% Zr | 3% K — |
| 17 | Al—Ba—La—MnCe(1:1) | 1.8 | — | 10% Ba | 9% La | 10% Ce | — | 10% Mn |
| 18 | Al—Ce—La—MnCeZr(2:2:1) | 1.6 | — | 10% Ba | 9% La | 8% Ce | 4% Zr | 8% Mn |
| 19 | NSR1 | 1.9 | 0.2 | 10% Ba$^{sm}$ | 9% La | 17% Ce | 3% Zr | — |
| 20 | NSR1 + K + Mg | 1.9 | — | 10% Ba$^{sm}$ | 9% La | 17% Ce | 3% Zr | 2% K 2% Mg |
| 21 | NSR1 + K + Ti | 2.4 | — | 10% Ba$^{sm}$ | 9% La | 17% Ce | 3% Zr | 3% K 1.5% Ti |

Cpd. = compound, wet: added to the catalyst from Ba nitrate by the wet method; sm: added in support material as Ba nitrate, comp. = comparative catalyst.

Adsorbent catalysts were made for the laboratory experiments by forming first a supportive material slurry of the powdered raw materials and of those in liquid form, and of water. The slurry was produced by adding the raw materials in the slurry and by grinding the sample in a ball mil. The properties of the raw materials (quality, purity, particle size, possible stabilizers) were chosen such that a permanent and smooth coating and result in the activity testing could be achieved. The BET surface area of pure aluminium oxide was 240 m$^2$/g and the particle size thereof (d$_{50}$) was about 30 mm before grinding. The BET of the Zr stabilized used was 180 m$^2$/g and the particle size thereof was 13 mm. Those components, which were normally added by impregnation or in soluble form, formed, depending on the concentration, particles (e.g. oxides of Ba, La, Y, K, Sr, and noble metals) the sizes of which were about 1–100 nm and that were distributed on the surface of the porous solid particles of the support material. Comparisons were made even using crosswise active compounds (Ba, Ce, La) that were added in varying forms (in soluble or crystalline form). In this way, the optimal way to produce a catalyst was sought after. Thin smooth or corrugated metal foils were coated with the slurry, the samples were dried at about 110° C. and they were calcinated for 4 hours at 550° C. A part of the adsorptive and active components were added in the support material by using the well known wet-impregnation method, in which the pores of the support material are filled with a solution of suitable concentration, whereby a desired amount of the compound in question remains in the sample. By calcination in static air most compounds formed corresponding oxides. Pt was impregnated in the catalyst by the so called chemosorption method, whereby Pt-amminecarbonate solution was used as a starting solution. Pt was fully impregnated onto the surface of the support material out of this kind of solution. A honeycomb-like sample, the hole number of which was 500 cpsi (holes/in$^2$) was realized by wrapping together one smooth and one corrugated coated foil. In a couple of samples (no. 14, 15 and 16) the compositions of the smooth and corrugated foil differed from one another. The specific surface area of the active support material developed (e.g. NSR1) that was fixed on a support structure surface was over 200 m$^2$/g fresh before use. The amount of support material on the surface of the metal foil (thickness 50 mm) was about 45–50 m$^2$/g (20% by weight).

In examples 9 and 11 presented hereafter, three-functional catalysts or oxidative catalysts according to Table 2 were used, in addition to the adsorbent catalyst.

TABLE 2

Three-functional catalysts and oxidative catalysts (Pd, Pt and Rh % by weight of metal, others % of oxide by weight in support material) used in laboratory testing.

| No. | Code | Pd % | Pt % | Rh % | Comp. 1 | Comp. 2 | Comp. 3 | Comp. 4 | Comp. 5 |
|---|---|---|---|---|---|---|---|---|---|
| I | 3T1 | 2.7 | — | 0.3 | 24% Ce | 16% La | 4% Zr | — | — |
| II | 3T2 | 3.5 | — | 0.5 | 1% Ce | 3% La | 4% Zr | — | — |
| III | OXI1 | 4.9 | 1.2 | — | — | — | — | — | — |

The activity of the adsorbents catalyst samples (diameter 14 mm, length normally 75 mm) was tested in laboratory conditions that simulated on the average exhaust gases from motors running on dilute gasoline, diesel or natural gas blends, whereby short enrichments are made on purpose in order to reduced the $NO_x$ adsorbed. Because in real circumstances durability is the problem, the activity of the samples was normally measured after they had first been hydrothermally aged (10% water in the air, space velocity about 4000 $h^{-1}$ in the sample) at 700° C. for 20 hours. In this way the best such samples were chosen that are hydrothermally durable in demanding, real exhaust gases. The inlet composition of the laboratory reactor was regulated by computerized mass flow regulators, and the composition was analyzed with the aid of continuous $NO_x$, CO, HC and $O_2$ analyzers. The conditions of activity measurements with laboratory equipment were as follows:

TABLE 3

Gas compositions used in laboratory simulation.

| Compound | Gasoline | | Diesel | | Natural Gas | |
|---|---|---|---|---|---|---|
|  | Dilute | Rich | Dilute | Rich | Dilute | Rich |
| NO, ppm | 500 | 1500 | 500 | 1500 | 700 | 500 |
| $C_3H_6$, ppm | 1000 | 1000 | 500 | 1000 | no | no |
| $CH_4$, ppm | no | no | no | no | 900 | 3000 |
| CO, % | 0.25 | 6 | 0.05 | 6 | 0.03 | 6 |
| $H_2$ | 0.08 | 2 | 0.04 | 2 | 0.08 | 2 |
| $O_2$, % | 7 | 0.1 | 7 | 0.8 | 7 | 0.1 |
| $H_2O$, % | 10 | 10 | 10 | 10 | 10 | 10 |
| $CO_2$, % | 10 | 10 | 10 | 10 | 10 | 10 |
| $SO_2$, ppm | no | no | no/25 | no/25 | no | no |
| $N_2$ | bal. | bal. | bal. | bal. | bal. | bal. |
| 1 ratio | 1.4 | 0.81 | 1.45 | 0.86 | 1.46 | 0.81 |
| SV, $h^{-1}$ | 30000 | 30000 | 30000 | 30000 | 30000 | 30000 |
| Time, sec | 15–240 | 2–5 | 60 | 5 | 60 | 5 |

SV = space velocity, amount of exhaust gas/volume of catalyst honeycomb

Average activities during 5 cycles were measured at temperatures in the range from 150° C. to 600° C. by increments of 50° C.

In activity tests in the laboratory according to the following examples the duration of the dilute phase was 60 sec and that of the rich phase was 5 sec. Space velocity was 30 000/h.

EXAMPLE 1

Figure 2:
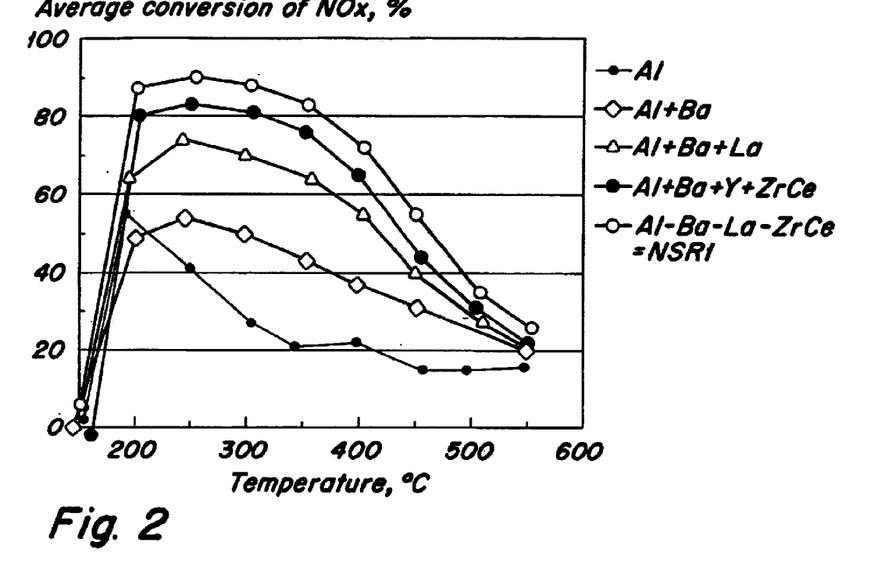
FIG. 2 is a plot of Average $NO_x$ conversion vs. Temperate data obtained as set forth in Example 1.

In the accompanying drawing 2 results of comparative experiments are presented. In this drawing, there is presented the average conversion of nitrogen oxides with aged samples containing Pt (composition in Table 1) in a laboratory activity test simulating gasoline exhausts (dilute phase 60 sec, rich phase 5 sec), where Pt/Al—Ba—Y—ZrCe and Pt/Al—Ba—La—ZrCe=NSR1 (sample no. 5) are adsorbent catalysts according to the invention.

In FIG. 2 samples according to the invention are compared to comparative catalysts that contain, in addition to aluminum oxide, Ba (sample no. 2) or Ba—La (sample no. 3). The samples contain equal amounts of Pt. The Pt/Al sample (sample no. 1) shows the basic level without adsorption additives. By adding a ZrCe mixed oxide (oxide ratio= 5.7:1, particle size about 13 mm ($d_5$)) to the sample the $NO_x$ activity of the catalyst was clearly improved (by almost 20% compared to the best comparative catalyst). Instead of La even Y could be used. When a sample contained only Ba and ZrCe, but no La, activity, especially at higher temperatures was poorer than with the samples according to the invention.

EXAMPLE 2

Figure 3:
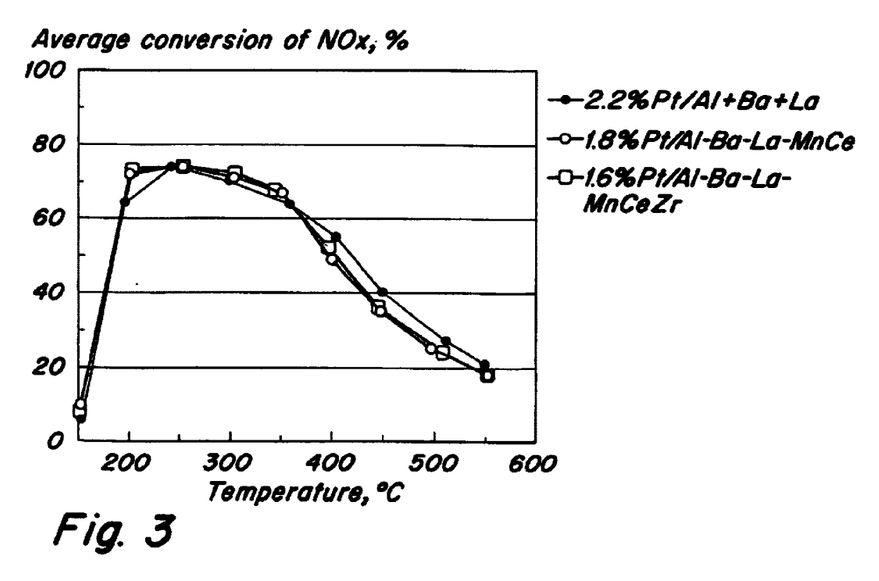
FIG. 3 is a plot of Average $NO_x$ conversion vs. Temperate data obtained as set forth in Example 2.

In the accompanying drawing 3 there is presented the average conversion of nitrogen oxides with aged samples containing Pt (composition in Table 1) in a laboratory activity test simulating gasoline exhausts (dilute phase 60 sec, rich phase 5 sec), where Pt/Al—Ba—La—MnCe (sample no. 17) and Pt/Al—Ba—La—MnCeZr (sample no. 18) are adsorbent catalysts according to the invention.

By using a mixed MnCe (1:1) or MnCeZr (2:2:1) oxide in the samples the activity was about 10% higher at 200° C. than that of Pt/Al—Ba—La (sample no. 3), even though the amount of Pt in one sample was 18%, and in the other 27%, lower than in the comparative sample. The example showed that the amount of the expensive noble metal could be reduced by using adsorbent catalysts according to the invention.

EXAMPLE 3

Figure 4:
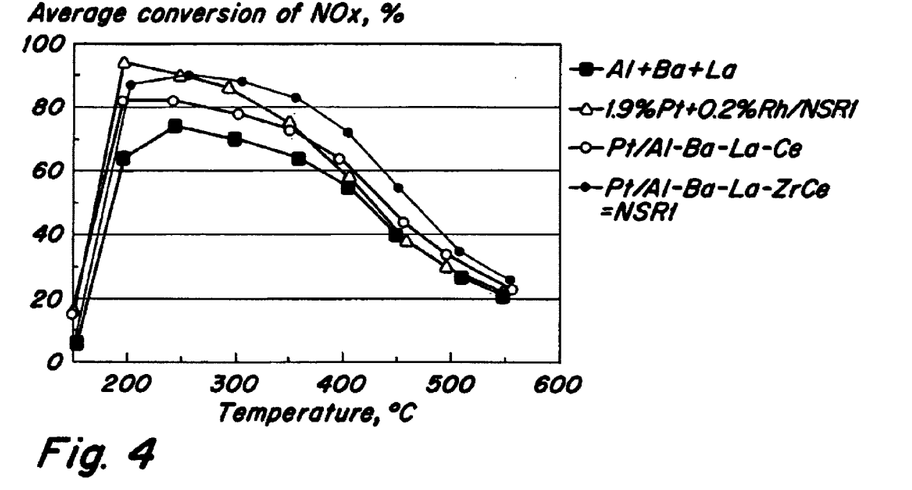
FIG. 4 is a plot of Average $NO_x$ conversion vs. Temperate data obtained as set forth in Example 3.

In the accompanying drawing 4 there is presented the average conversion of nitrogen oxides with aged samples containing Pt and Rh (composition in Table 1) in a laboratory activity test simulating gasoline exhausts (dilute phase 60 sec, rich phase 5 sec), where Pt+Rh/Al—Ba—La—ZrCe (sample no. 19), Pt/Al—Ba—La—Ce (sample no. 4) and Pt/Al—Ba—La—ZrCe=NSR1 (sample no. 5) are adsorbent catalysts according to the invention and Pt/Al—Ba—La (sample no. 3) is a comparative catalyst.

In FIG. 4 there are presented a comparative catalyst and samples according to the invention where Rh has been added to NSR1, or pure cerium oxide has been used instead of ZrCe. By adding Rh, $NO_x$ function at lower temperatures could be improved. An equal amount of pure cerium oxide functions less effectively than the Zr stabilized cerium oxide in the samples in question, however, functioning was distinctly better than that of the comparative sample. Comparison showed the beneficial effect of Zr.

EXAMPLE 4

Figure 5:
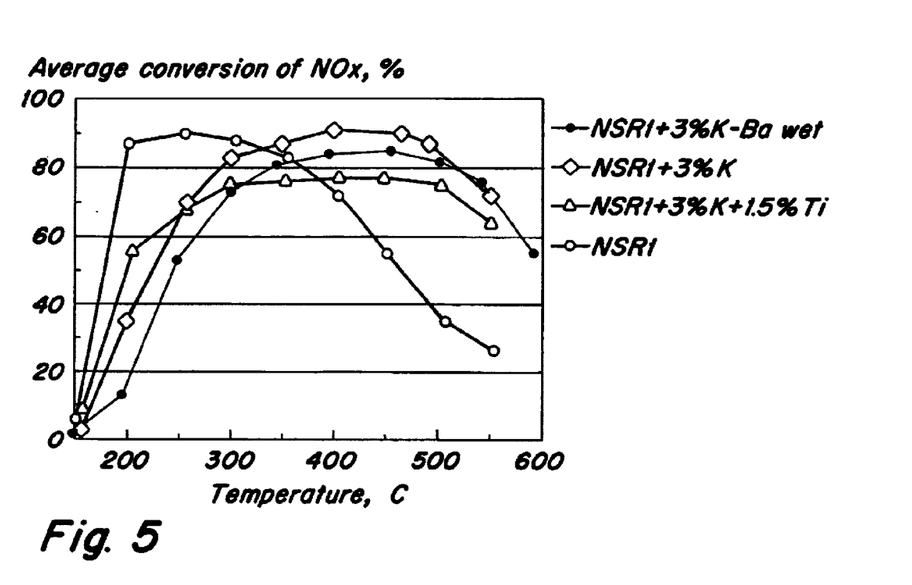
FIG. 5 is a plot of Average $NO_x$ conversion vs. Temperate data obtained as set forth in Example 4.

In the accompanying drawing 5 there is presented the average conversion of nitrogen oxides with aged adsorbent catalysts according to the invention that contained Pt (composition in Table 1) in a laboratory activity test simulating gasoline exhausts (dilute phase 60 sec, rich phase 5 sec).

By adding K to the basic NSR1 concept realized (sample no. 9) or K and Ti (sample no. 21), the operative window could be widened to higher temperatures. If Ti alone was added to NSR1, the functioning was weighted to lower temperatures. In the drawing, there is also presented a comparison, of how the way in which Ba is added affects activity. According to tests, it is possible to add Ba e.g. as nitrate (acetate) directly in soluble or crystalline form in the support material, or to add it by wet-post-impregnation, even though then the activity is some what lower than that of the best version.

EXAMPLE 5

Figure 6:
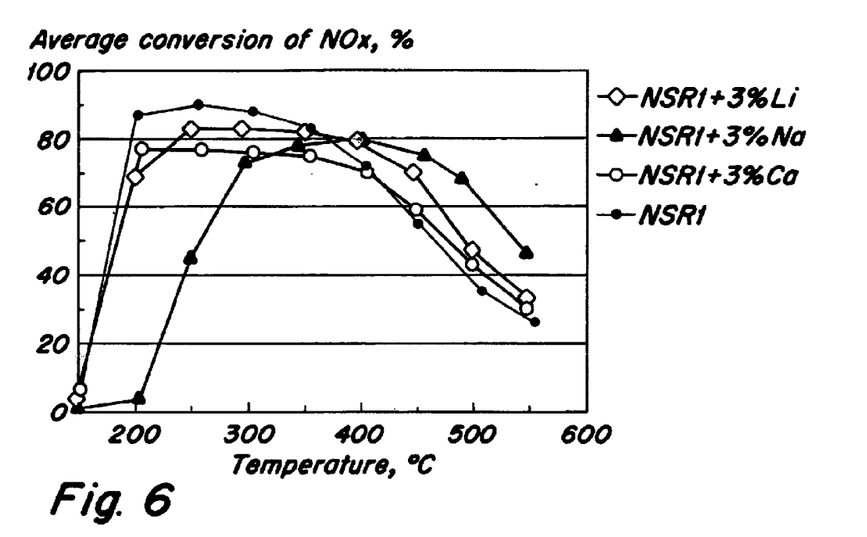
FIG. 6 is a plot of Average $NO_x$ conversion vs. Temperate data obtained as set forth in Example 5.

In the accompanying drawing 6 there is presented the average conversion of nitrogen oxides with aged adsorbent catalysts according to the invention that contained Pt (composition in Table 1) in a laboratory activity test simulating gasoline exhausts (dilute phase 60 sec, rich phase 5 sec).

By adding Li to the basic NSR1 concept (sample no. 13), Na (sample no. 12) or Ca (sample no. 11), the operative window can be widened to higher temperatures.

EXAMPLE 6

Figure 7:
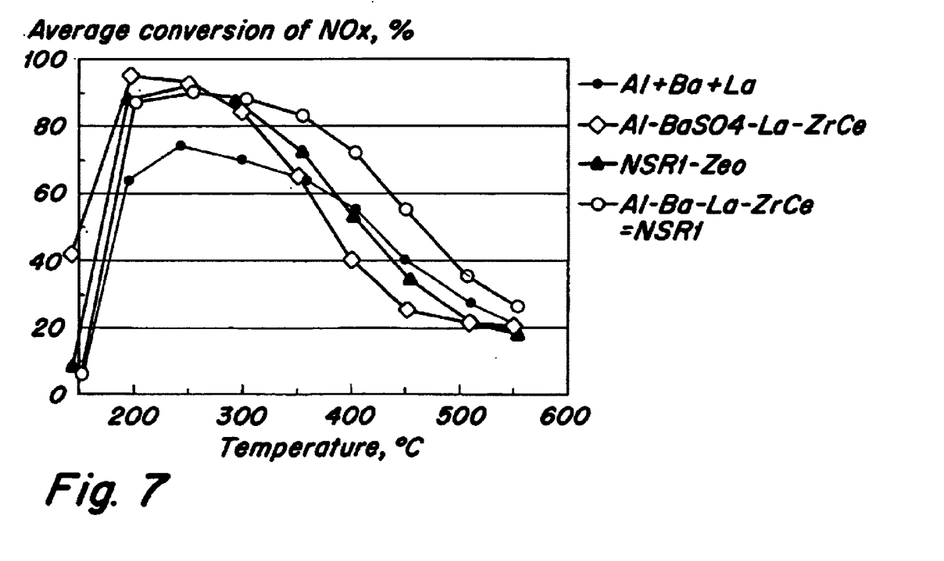
FIG. 7 is a plot of Average $NO_x$ conversion vs. Temperate data obtained as set forth in Example 6.

In the accompanying drawing 7 there is presented the average conversion of nitrogen oxides with aged adsorbent catalysts according to the invention that contained Pt (composition in Table 1) in a laboratory activity test simulating gasoline exhausts (dilute phase 60 sec, rich phase 5 sec).

The adsorbent catalyst functioned better than the comparative sample Pt/Al—Ba—La (sample no. 3), when Ba was added to the sample as Ba sulfate (sample no. 7), or when hydrothermally relatively durable ZSM5 zeolite was added (sample no. 8). When using Ba sulfate, functioning was improved especially at lower temperatures, and was clearly weakened at over 300° C.

EXAMPLE 7

Figure 8:
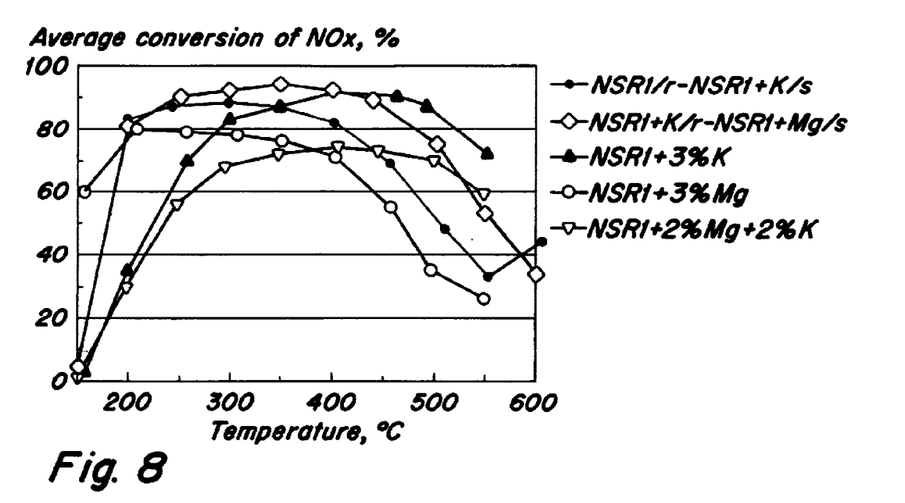
FIG. 8 is a plot of Average $NO_x$ conversion vs. Temperate data obtained as set forth in Example 7.

In the accompanying drawing 8 there is presented the average conversion of nitrogen oxides with aged adsorbent catalysts according to the invention that contained Pt (composition in Table 1) in a laboratory activity test simulating gasoline exhausts (dilute phase 60 sec, rich phase 5 sec). The activity was improved by varying the composition.

In activity testing, a considerably broader operational window was accomplished when an adsorbent catalyst was mounted in the reactor where in the smooth and in the corrugated foil mutually differing compositions were used in regard to the catalytic function and adsorptive characteristics (FIG. 8). By positioning in the flow direction side-by-side compositions of which one has a good operative window at low temperatures (NSR1, NSr1+Mg) and the other at high temperatures (NSR1+K), a honeycomb-like sample was realized which functioned as the best combination of the best separate activities. Catalysts, the functioning of which is based on continuous reduction of $NO_x$ with hydrocarbons, cannot function in this way, but the high temperature catalyst would have to be positioned in the front and the low temperature catalyst thereafter. If the catalysts were to be positioned side-by-side, the more active catalyst surface would quickly consume the reducing agents at those temperatures at which the high temperature catalyst could function. In this respect, an adsorbent catalyst is totally different from a catalyst whose functioning is based on continuous reduction. With an adsorbent catalyst a good reductive capacity may be realized even at 550° C., even though the adsorbent catalyst were positioned side-by-side with an adsorbent catalyst or a catalyst the ignition temperature of which were even 200° C. lower than that of the high temperature adsorbent catalyst. A comparative catalyst (sample no. 20), to which was added 2% of Mg and 2% of K to both surfaces, was decidedly weaker, even though the total amounts of K and of Mg in that sample were somewhat higher in the whole catalyst compared to a differentiated solution (e.g. sample no. 14). The positioning of both Mg and K to the same support material destroyed both low (sample no. 10) and high (sample no.9) temperature functions. The result shows that the adsorption sites of low and high temperatures must be differentiated in order to realize an optimal functioning in accordance to the invention.

EXAMPLE 8

Figure 9:
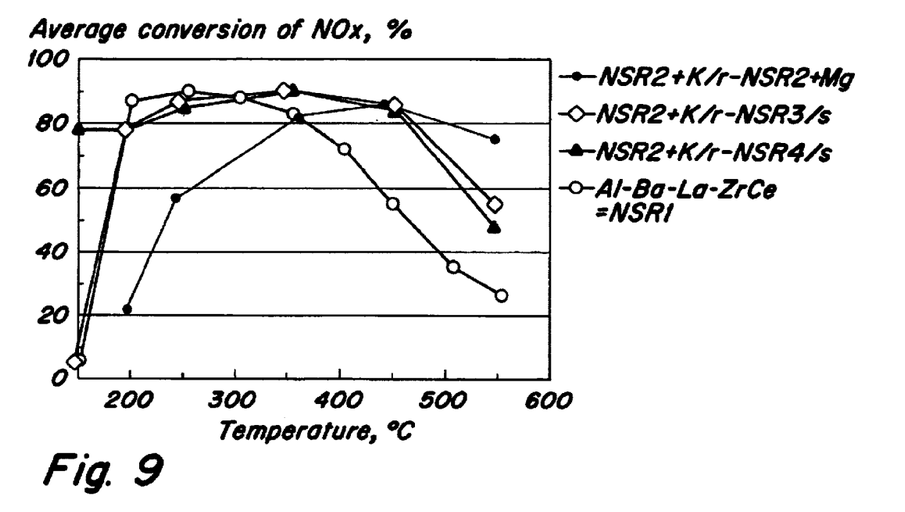
FIG. 9 is a plot of Average $NO_x$ conversion vs. Temperate data obtained as set forth in Example 8.

In the accompanying drawing 9 there is presented the average conversion of nitrogen oxides with aged adsorbent catalysts according to the invention that contained Pt and Rh (composition in Table 1) in a laboratory activity test simulating gasoline exhausts (dilute phase 60 sec, rich phase 5 sec). The activity and adsorption were improved by varying the composition.

In this example the composition of differentiated surfaces (sample no. 15) was somewhat varied. NSR2 differs from NSR1 only in the mode of adding Ba. The aim was to improve functioning of HK1 especially at low temperatures, because for dilute subjects temperatures may be less than 400° C. for extended periods, contrary to stoichiometric engines. By varying the composition of the smooth foil in NSR3 in such a way that the amount of La was reduced and the amounts of Ce and Zr were increased, the adsorbent catalyst HK2 was realized which functioned well as a side-by-side positioned foils even at low temperatures. To the samples, even Rh was added, along with Pt. The oxide ratio Ce—Zr was 4.8 in NSR3. At the same time, up to 15% Ba was added to the corrugated foil.

With NSR4 even better results were realized together with NSR2+K (sample no. 16) at low temperatures, whereby the most relevant change was that in the low temperature adsorbent catalyst (NSR4), Ba was decreased to 5%, Ce to 4.4% and Zr to 0.7%, compared to NSR2 or NSR3. This result was accomplished with these changes and with an increased PtRh load (2.2% Pt, 0.3% Rh).

EXAMPLE 9

Figure 10:
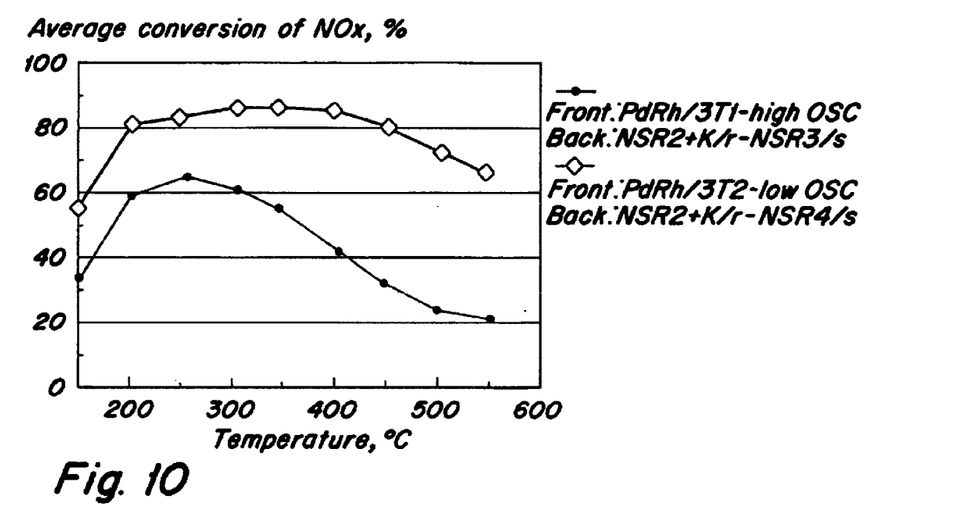
FIG. 10 is a plot of Average $NO_x$ conversion vs. Temperate data obtained as set forth in Example 9.

In automobiles running on dilute gasoline even three-functional properties are needed, whereby a preferred solution is to position in front of the adsorbent catalyst a three-functional catalyst that has a very low oxygen storage capacity (FIG. 10). HK3 (sample no. 16) functioned clearly better together with a three-functional catalyst that had low OSC (sample no. II) than HK2 (sample no. 15) together with a catalyst with high OSC (sample no. I).

In the accompanying drawing 10 there is presented the average conversion of nitrogen oxides for a combination in accordance to the invention, where in front of the aged adsorbent catalysts containing Pt and Rh, there is positioned a three-functional catalyst with high and low oxygen storage capacities (compositions in Tables 1 & 2) in a laboratory activity test simulating gasoline exhausts (dilute phase 60 sec and rich phase 5 sec). The length of the front catalyst is 26 mm and that of the back adsorbent catalyst is 47 mm. Improved activity and adsorption were realized by optimizing the combination.

EXAMPLE 10

Figure 11:
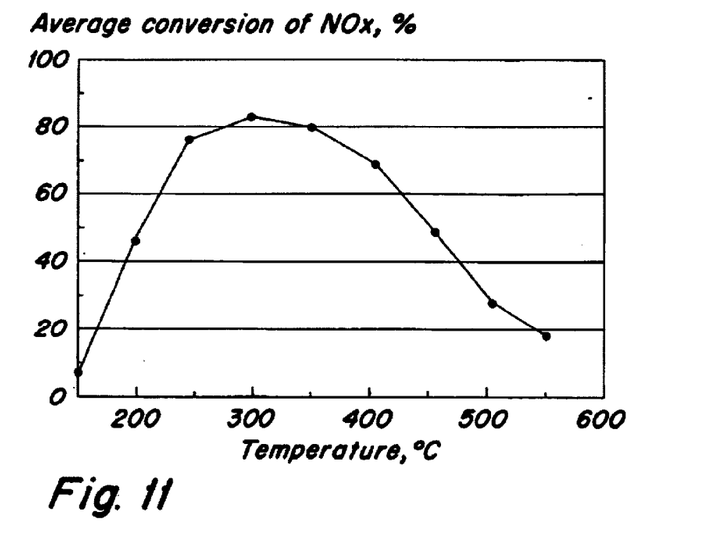
FIG. 11 is a plot of Average $NO_x$ conversion vs. Temperate data obtained as set forth in Example 10.

By using the inventive Pt catalyst good results were obtained also in the presence of sulfur in a gaseous mixture simulating diesel exhausts whereby the duration of the dilute phase was 60 sec and that of the rich phase was 5 sec. The catalyst had been sulfurized beforehand for 60 min with an exhaust gas containing 25 ppm of sulfur. The accumulation of sulfur weakens the adsorptive capacity especially at high temperatures, but in circumstances typical of diesel engines (200–350° C.) the functional capacity was retained for a long time, and it could eventually be regained partly or totally during functioning/regeneration taking place at high temperatures (>350° C.).

The results are presented in FIG. 11, where there is presented the average conversion of nitrogen oxides in circumstances simulating diesel conditions with an aged adsorbent catalyst according to the invention containing Pt (NSR1, sample no. 5, composition in Table 1) in a laboratory activity test (dilute phase 60 sec, rich phase 5 sec), when the exhaust contains 25 ppm of $SO_2$.

EXAMPLE 11

Figure 12:
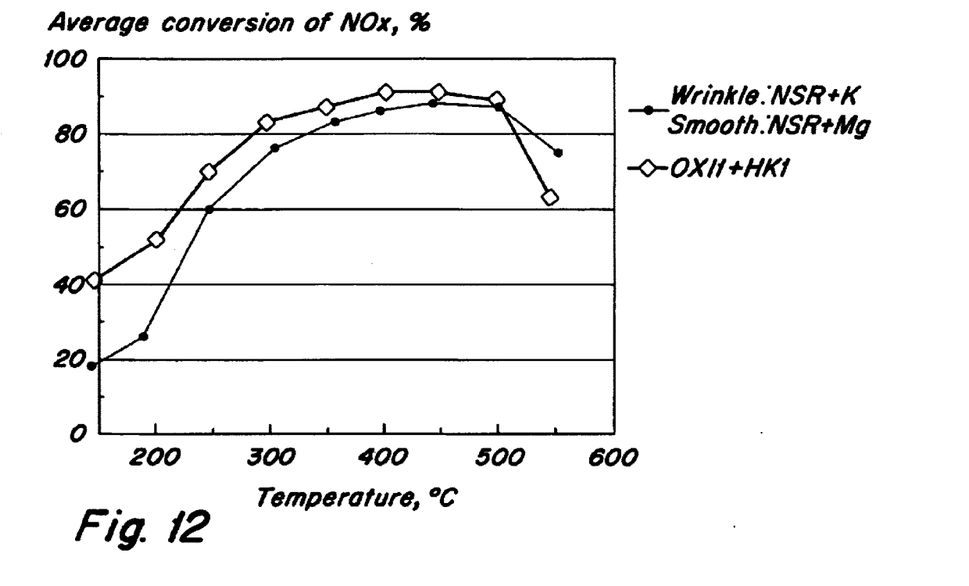
FIG. 12 is a plot of Average $NO_x$ conversion vs. Temperate data obtained as set forth in Example 11.

Similarly, an exhaust gas of a truck running on natural gas was simulated. For oxidization of methane a typical efficient PdPt oxidative catalyst (composition in Table 2) was positioned in front of the adsorbent catalyst. In the experiment, over 90% conversion was reached, and the oxidative catalyst (sample no. III) in front of the adsorbent catalyst (sample no. 14) had a positive impact on reduction of $NO_x$.

The results are presented in FIG. 12, in which there is presented the average conversion of nitrogen oxides in circumstances simulating exhausts from an engine running on natural gas with an aged adsorbent catalyst according to the invention containig Pt (composition in Table 1) in a laboratory activity test (dilute phase 60 sec, rich phase 5 sec). The length of the front catalyst was 45 mm and that of the back adsorbent catalyst was 75 mm.

While the present invention has been described by reference to the above-mentioned embodiments, certain modifications and variations will be evident to those of ordinary skill in the art. Therefore the present invention is to be limited only by the scope and spirit of the appended claims.

I claim:

1. An adsorbent catalyst for reducing amounts of nitrogen oxides, hydrocarbons and carbon monoxide contained in exhaust or combustion gases, wherein the catalyst adsorbs nitrogen oxides when the exhaust or combustion gases contain an excess of oxygen, and liberates and reduces the adsorbed nitrogen oxides when said gases contain oxygen in stoichiometric amounts or less, the adsorbent catalyst comprising a porous support material containing at least the following components:
   (i) a first catalytic metal comprising Pt;
   (ii) a first $NO_x$ adsorbent comprising at least one of the following metals: Ba and Sr;
   (iii) a second $NO_x$ adsorbent comprising at least one of the following metals: La and Y; and
   (iv) a redox $NO_x$ adsorbent comprising at least one of the following metals: Ce, Zr, Ti, Nb, Mn, Pr, Nd, Sm, Eu and Gd;
   wherein components (i)–(iv) are present in an amount effective to adsorb nitrogen oxides when the exhaust or combustion gases contain an excess of oxygen, and liberate and reduce the adsorbed nitrogen oxides when said gases contain oxygen in stoichiometric amounts or less.

2. An adsorbent catalyst according to claim 1, further comprising a second catalytic metal, which comprises at least one of the following metals: Rh, Pd and Ir.

3. An adsorbent catalyst according to claim 1, further comprising a third $NO_x$ adsorbent, which contains at least one of the following metals: K, Na, Li, Ca, Rb and Cs.

4. An adsorbent catalyst according to claim 1, further comprising a fourth $NO_x$ adsorbent, which contains at least one of the following metals: Mg and Be.

5. An adsorbent catalyst according to claim 1, wherein the adsorbents are in the form of oxides, sulfates, nitrates, aluminates or metals.

6. An adsorbent catalyst according to claim 1, wherein the redox $NO_x$ adsorbent contains at least one of Ce and Zr.

7. An adsorbent catalyst according to claim 6, wherein the redox $NO_x$ adsorbent is a mixed oxide of ZrCe, MnCeZr or MnCe.

8. An adsorbent catalyst according to claim 2, comprising a first surface, on which there is a first coating which contains the support material and at least a portion of said adsorbents, and a second surface, on which there is a second coating which contains the support material and at least a portion of said adsorbents.

9. An adsorbent catalyst according to claim 8, wherein the first surface is formed by an essentially smooth metal foil, and the second surface is formed by a corrugated metal foil, the foils forming a honeycomb comprising numerous flow channels for gas.

10. An adsorbent catalyst according to claim 8, wherein the first catalytic metal is Pt and is present in both coatings, and the second catalytic metal is present only in one coating.

11. An adsorbent catalyst according to claim 9, wherein the first catalytic metal is divided concentration-wise between the foils such that in one foil the Pt load is 0–90 g/ft3 and in the other foil the Pt load is 70–400 g/ft$^3$.

12. An adsorbent catalyst according to claim 9, wherein the first $NO_x$ adsorbent is divided concentration-wise between the foils such that in the support material of one foil the concentration is 8–40% by weight, and in the support material of the other foil the concentration is 0–10% by weight, wherein the weight % concentrations have been calculated as oxides in relation to the weight of the support material.

13. An adsorbent catalyst according to claim 9, wherein the second $NO_x$ adsorbent is divided concentration-wise between the foils such that in the support material of one foil the concentration is 8–40% by weight, and in the support material of the other foil the concentration is 0–8% by weight, wherein the weight % concentrations have been calculated as oxides in relation to the weight of the support material.

14. An adsorbent catalyst according to claim 9, wherein the redox adsorbent is divided concentration-wise between the foils such that in the support material of one foil the concentration is 10–60% by weight, and in the support material of the other foil the concentration is 0–10% by weight, wherein the weight % concentrations have been calculated as oxides in relation to the weight of the support material.

15. An adsorbent catalyst according to claim 9, wherein the adsorbents are wholly in the support material of one foil, and the catalytic metals are wholly in the support material of the other foil.

16. An adsorbent catalyst according to claim 1, wherein the support material contains at least one of the following oxides: aluminum oxide, zeolite, aluminum silicate and silica.

17. An adsorbent catalyst according to claim 5, wherein the absorbents are in the form of oxides.

18. An adsorbent catalyst according to claim 8, wherein the first and second coatings each have a composition which are substantially identical.

19. An adsorbent catalyst according to claim 8, wherein the first and second coatings each have a composition which differ from each other.

20. An adsorbent catalyst according to claim 12, wherein the concentration of the first $NO_x$ absorbent in one foil is 10–20% by weight, and the concentration in the other foil is 3–8% by weight.

21. An adsorbent catalyst according to claim 13, wherein the concentration of the second $NO_x$ adsorbent in one foil is 5–15% by weight, and the concentration in the other foil is 1–6% by weight.

22. An adsorbent catalyst according to claim 14, wherein the concentration of the redox adsorbent in one foil is 15–25% by weight, and the concentration in the other foil is 2–5% by weight.

23. An adsorbent catalyst according to claim 15, wherein the adsorbents are wholly in the smooth foil, and the catalytic metals are wholly in the corrugated foil.

24. The adsorbent catalyst according to claim 12, wherein the concentration of the firs: $NO_x$ adsorbent in the support material of the other foil is 3–8% by weight.

25. An adsorbent catalyst for reducing amounts of nitrogen oxides, hydrocarbons and carbon monoxide contained in exhaust or combustion gases, wherein the catalyst adsorbs nitrogen oxides when the exhaust or combustion gases contain an excess of oxygen, and liberates and reduces the adsorbed nitrogen oxides when said gases contain oxygen in stoichiometric amounts or less, the adsorbent catalyst comprising a porous support material comprising:

(i) a first catalytic metal comprising Pt;

(ii) a second catalytic metal comprising Rh;

(iii) a first $NO_x$ adsorbent comprising at least one of the following metals: Ba and Sr;

(iv) a second $NO_x$ adsorbent comprising at least one of the following metals: La and Y; and (v) a redox $NO_x$ adsorbent comprising at least one of the following metals: Ce, Zr, Ti, Nb, Mn, Pr, Nd, Sm, Eu and Gd;

wherein components (i)–(v) are present in an amount effective to adsorb nitrogen oxides when the exhaust or combustion gases contain an excess of oxygen, and liberate and reduce the adsorbed nitrogen oxides when said gases contain oxygen in stoichiometric amounts or less.

* * * * *